UNITED STATES PATENT OFFICE.

OSCAR GÜNTHER, OF ELBERFELD, GERMANY, ASSIGNOR TO FARBENFABRIKEN VORM. FRIEDR. BAYER & CO., OF ELBERFELD, GERMANY, A CORPORATION OF GERMANY.

RED-VIOLET COLORING-MATTER.

1,009,741.  Specification of Letters Patent.  Patented Nov. 28, 1911.

No Drawing.   Application filed July 18, 1911.  Serial No. 639,125.

*To all whom it may concern:*

Be it known that I, OSCAR GÜNTHER, doctor of philosophy, chemist, citizen of the German Empire, residing at Elberfeld, Germany, have invented new and useful Improvements in Red-Violet Coloring-Matter, of which the following is a specification.

My invention relates to the manufacture and production of new azo dyes which dye cotton from red to violet-red shades fast to light.

The process for their production consists in combining the tetrazo compound of para-para'-diaminodiphenylurea-meta-meta'-disulfonic acid in acid or neutral solution with one molecule of a 2-amino-8-naphthol-6-sulfonic acid compound of the formula:

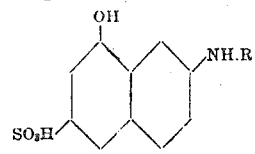

are after being dried and pulverized in the shape of their sodium salts dark powders soluble in water; yielding upon reduction with stannous chlorid and hydrochloric acid para-para'-diaminodiphenylurea-meta-meta'-disulfonic acid which is further split up into $CO_2$ and para-phenylenediamin-sulfonic acid, a 1.2-diamino-8-naphthol sulfonic acid compound:

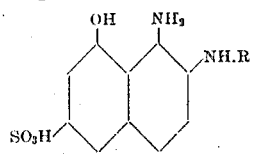

and a 2,6-diamino-5-naphthol-7-sulfonic acid compound:

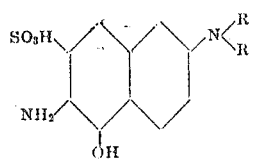

R having the above defined meaning.

R=H which may be replaced by a substituent *e. g.*

$$-CH_3, -C_2H_5, -C_6H_5, -C_6H_4-CH_3,$$

etc., as one component and in alkaline or neutral solution with a 2-amino-5-naphthol-7-sulfonic acid compound of the formula:

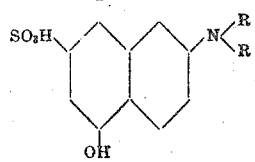

R means H which may be replaced by a substituent, one H must always be a substituent *e. g.*

$$-CH_3, -C_2H_5, -C_6H_5, -C_6H_4-CH_3$$

as second component.

The new dyes having most probably the formula:

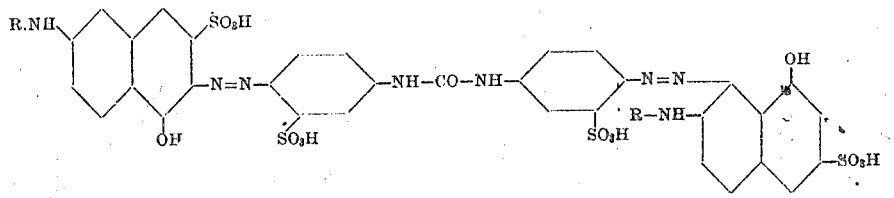

The following example may illustrate my invention, the parts being by weight:—The tetrazo compound obtained from 402 parts of para-para'-diaminodiphenylurea-meta-meta'-disulfonic acid (see United States Letters Patent No. 687171, dated November 19, 1901) is combined with 261 parts of the sodium salt of 2-amino-8-naphthol-6-sulfonic acid and the resulting intermediate compound is combined in alkaline solution with 315 parts of 2-phenylamino-5-naphthol-7-sulfonic acid. The dye is salted out, filtered off and dried. It is after being dried and pulverized in the shape of its sodium salt a dark powder soluble in concentrated sulfuric acid with a blue coloration; yielding upon reduction with stannous chlorid and hydrochloric acid para-para'-diaminodiphenylurea-meta-meta'-disulfonic acid which is further split up into $CO_2$ and para-phenylenediamin-sulfonic acid, 1.2-diamino-8-naphthol-6-sulfonic acid and 2-phenylamino-6-amino-5-naphthol-7-sulfonic acid. The new dye dyes cotton a reddish-violet shade fast to light and to ironing.

I claim:—

1. The herein described new azo dyes obtainable from 2-amino-8-naphthol-6-sulfonic acid, sulfo acids of diaminodiphenylureas and 2-amino-5-naphthol-7-sulfonic acid which are after being dried and pulverized in the shape of their sodium salts dark powders soluble in water, yielding upon reduction with stannous chlorid and hydrochloric acid para-para'-diaminodiphenyl-urea-meta-meta'-disulfonic acid which is further split up into $CO_2$ and para-phenylenediamin-sulfonic acid, 1.2-diamino-8-napthol-6-sulfonic acid and 2-phenylamino-6-amino-5-naphthol-7-sulfonic acid; urea-meta-meta'-disulfonic acid which is further split up into $CO_2$ and para-phenylenediamin-sulfonic acid, a 1.2 diamino-8-naphthol sulfonic acid compound and a 2.6-diamino-5-naphthol-7-sulfonic acid compound; dyeing cotton from red to violet-red shades fast to light, substantially as described.

2. The herein described new azo dye having most probably the formula:

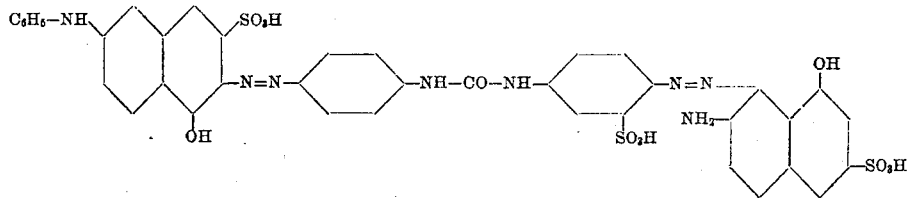

which is after being dried and pulverized in the shape of its sodium salt a dark powder soluble in concentrated sulfuric acid with a blue coloration; yielding upon reduction with stannous chlorid and hydrochloric acid para-para'-diaminodiphenyl-urea-meta-meta'-disulfonic acid which is further split up into $CO_2$ and para-phenylenediamin-sulfonic acid, 1.2-diamino-8-napthol-6-sulfonic acid and 2-phenylamino-6-amino-5-naphthol-7-sulfonic acid; and dyeing cotton a reddish-violet shade fast to light and to ironing, substantially as described.

In testimony whereof I have hereunto set my hand in the presence of two subscribing witnesses.

OSCAR GÜNTHER. [L. S.]

Witnesses:
ALFRED HENKEL,
ALBERT T. NUFER.